United States Patent [19]

Johnson et al.

[11] Patent Number: 5,393,545

[45] Date of Patent: Feb. 28, 1995

[54] COMPOSITION ACTIVE AGAINST BOTULISM

[75] Inventors: Eric A. Johnson, Madison, Wis.; Ernani Dell'Acqua, Milan, Italy

[73] Assignee: Solchem Italiana S.p.A., Milan, Italy

[21] Appl. No.: 13,072

[22] Filed: Feb. 3, 1993

[30] Foreign Application Priority Data

Feb. 5, 1992 [IT] Italy .................. MI 92A 000217

[51] Int. Cl.6 .................. A23B 4/00; A23B 7/00
[52] U.S. Cl. .................. 426/268; 424/94.61; 514/106; 514/423; 514/557; 514/562; 514/566; 514/673
[58] Field of Search .................. 424/94.61; 514/106, 514/423, 557, 562, 566, 673; 426/268

[56] References Cited

U.S. PATENT DOCUMENTS 4,233,290 11/1980 Ferrari et al. .................. 424/94
4,810,508 3/1989 Dell'Acqua et al. .................. 426/34

OTHER PUBLICATIONS

Okereke, et al., *Biosis*, BA90:27436, 1990.
Hughey et al., *Chemical Abstracts*, vol. 107, No. 151086m, 1987.
Maas et al., *Chemical Abstracts*, vol. 111, No. 230845u, 1989.
Winarno et al., *Chemical Abstracts*, vol. 75, No. 137,939f, 1971.
Habermann et al., *Chemical Abstracts*, vol. 115, No. 67320r, 1991.
Patonay et al., *Chemical Abstracts*, vol. 116, No. 158965s, 1992.

*Primary Examiner*—Marianne M. Cintins
*Assistant Examiner*—William R. A. Jarvis
*Attorney, Agent, or Firm*—Oblon, Spivak, McClelland, Maier & Neustadt

[57] ABSTRACT

This invention relates to a composition of food having animal and/or vegetable origin which contains lysozyme and a chelating agent in amounts that are effective at preventing contamination of the food by *Clostridium botulinum*.

5 Claims, 4 Drawing Sheets

COMPOSITION ACTIVE AGAINST BOTULISM

The present invention relates to a specific use of lysozyme to combat the contamination of use of lysozyme to combat the contamination of foods having animal and/or vegetal origin caused by particular microorganisms.

Foods intoxications caused by Clostridium botulinum are well known since a long time and they are among the most serious intoxications. The first cases happened because of sausages consumption and it has been believed for a long time that Clostridium botulinum could be transmitted only by proteins having an animal origin. Nevertheless it has been then demonstrated that also the foods having a vegetal origin could be responsible for this type of toxinfection.

Clostridium botulinum is a sporigen mesophile germ. It has bacillary form and rounded ends. It presents itself as isolated, coupled or in chains, sometimes even long chains. It has ovoidal spores. It is gram-positive, gas producer and anaerobic. Different types thereof are known: A, B, C, D, E, F and G (some of which are proteolytic and some others are non-proteolytic).

The growing optimal temperature is 37° C., excepted the F type whose optimal growing temperature is 30° C. The growing minimum temperature varies depending on the type. A and B types do not grow under 12.5° C., while E and F types grow and produce toxin also at 3.3° C. and at 4° C. respectively.

Also the growing maximum temperature varies depending on the type. A and B types grow even at 50° C. or at 45° C., depending on the fact that the inoculum is made by vegetative forms or spores. The E type grows at a temperature that is 5° C. lower.

The Clostridium botulinum spores are relatively thermoresistant. Said thermal resistance decreases at a low pH. The thermal resistance for A and B types is high while E type spores result relatively thermosensitive.

The botulinic toxin, responsible for toxinfections, is classified among exotoxins, even if the production thereof occurs in cytoplasm, wherefrom it frees itself after the cell lysis. It has a simple proteic nature, i.e. it is formed by amino acids only, and it is thermolabile. It is one of the most dangerous toxins having a $DL_{50}$ of about $10^{-6}$ mg/Kg for rat.

The toxins more frequently responsible for toxinfections are those ones of the A, B, and E types. The B type Clostridium botulinum is often in the swine intestine, wherefrom it moves into muscular masses where it sporifies. It stands cooking and during its preservation it can originate the vegetative form which produces the toxin. The E type has been found in the intestine of many fishes, especially in the sturgeon family.

For what concerns the epidemiologic aspect, the morbid syndrome generally shows itself within 12–36 hours since contaminated food ingestion. However even incubation periods of 4 hours and 4 days have been described. The symptomatology generally shows itself to the prejudice of gastroenteric apparatus, and nervous phenomena with nausea, vomit, burns, gastroenteric pains appear after 12–24 hours. Stupefaction symptoms, vertigos then follow, accompanied by mouth and tongue dryness and by pharyngal pains. Sometimes diarrhoea phenomena occur which in the last stages can be substituted by constipation.

The nervous phenomena are represented by sight disorders, extraocular muscles paralysis, light stimula reflexes loss, deglutition and phonesis disorders. Afterwards larynx paralysis occurs and in mortal cases, death occurs by respiratory paralysis. The body temperature is always normal.

Generally the disease, in mortal cases, lasts 3–6 days, even if cases having a duration of 26 days have been described, and cases, especially those ones caused by the E type, wherein death has occurred within 20–24 hours from the contaminated food ingestion.

Given the seriousness of Clostridium botulinum toxoinfections, the problem to have a food void of such type of contamination has an enormous importance. It has however to be added that it is not sufficient to have a food which is void of the above said botulinic germs when ingesting it, but it needs to be void of toxins produced by the above said germs during the food preparation or preservation.

In particular the E type is able to produce the toxin also at the preservation temperature of 4°–5° C. and toxins then, remain stable at this temperature.

The problem which therefore raises is not only that one to combat the germ, but also to avoid the toxins formation.

The preservation of food under vacuum does not guarantee the toxins production inhibition. In fact botulism cases have happened due to pre-packaged foods in plastic films under vacuum, wherein it has been demonstrated that the toxin can develop within 5 days when the preservation temperature is higher than 10° C.

One of the conventional physical means to combat Clostridium botulinum is pH. In fact, Clostridium botulinum is not able to grow and to produce toxins at a pH lower than 4.6. However not all foods can bear a so low pH, most of all in relation to their palatability.

Another factor which can affect Clostridium botulinum is temperature. Clostridium botulinum is one of the most heat resistant pathogenic germs. The temperature value necessary to its destruction is obviously connected also to the heating period. For instance, the same effect of heating for about 330 minutes at 100° C. is obtained at 118° C. for about 6 minutes. However not all foods are equally resistant to this time/temperature combination, most of all as to the colour, the taste, the smell and the nutritional value thereof.

Another problem connected to temperature is that one concerning canned foods which, because of their anaerobiosis conditions are an ideal environment for the Clostridium botulinum growth. In fact the temperature needed for its destruction has to reach the box centre. The heat transmission from the outside toward the inside mostly for canned solid foods is very slow, therefore the heating times become very long and all this to the prejudice of food quality.

Besides to the physical means one can have resort to the use of chemical additives; those ones used nowadays to combat Clostridium botulinum are nitrites, in particular in the products having an animal origin. They contribute to the pink-red colour and to the stability of said colour during the meat products heating; they have also a somewhat effect on their taste. Nitrites lower the temperature needed to destroy Clostridium botulinum and inhibit the spores germination.

Around 1960, indeed, it has been noted that nitrites react with certain amino compounds to form nitrosamines, strongly carcinogenic substances.

In view of this fact, there is a tendency to reduce the nitrites use dosages. At the same time the studies to find out safe substances from a toxicological point of view have multiplied to prevent Clostridium botulinum toxoinfections.

There has been surprisingly found and it is the subject of the present invention a composition to combat the contamination of foods having an animal and/or vegetal origin susceptible to be contaminated by Clostridium botulinum and/or by the toxins deriving therefrom, characterized in that the said composition comprises lysozyme or the non toxic salts thereof alone or added with at least one synergic agent selected from the group comprising: the alkaline salts of ethylendiamino tetracetic, (ethylendioxy)-diethylendinitriloacetic, diethylentriaminopentacetic, trans 1,2-diaminocyclohexan tetracetic, tripolyphosphoric acids and proline, cysteine, alkaline lactates and ethylendiamine.

In particular the lysozyme non toxic salts are the hydrochloride, the lactate, the phosphate and the citrate.

Lysozyme is a well known substance, widespread in nature, completely void of toxicity, it does not change the organoleptic properties of foods and it is heated and time stable at the foods pH. It is a basic protein, which is produced on industrial scale by extraction from egg white wherein it is present in 0.4–0.5% amount. Its use in the food field is already known per se. In dairy industry it is useful to prevent in some cheeses the late blowing phenomenon due to the presence of Clostridium tyrobutyricum in milk. The use of lysozyme in this field to combat the action of such a microorganism has already been a patent subject (GB 2 014 032).

From a technological point of view the use of lysozyme or of the salts thereof alone or in combination with adjuvant or synergistic substances to combat Clostridium botulinum, offers a great advantage.

Said use in fact does not involve any change in the methods of preparation, packaging and preservation of the food in question adopted by the various food industries.

Activity tests have been carried out on different Clostridium botulinum strains isolated from food, in particular on those ones pertaining to proteolytic A, B and F type, and to non-proteolytic E and B type, which are the most frequent responsible for botulism toxoinfections.

These activity tests have been carried out not only on vegetative forms, but also, on spores, inoculating them in meat and vegetal foods.

Besides, controls on botulinic toxins have been effected causing their formation during the incubation phase to verify if their inhibition or inactivation occurred during said phase.

The single strains were purified separating the single colonies among them. The lysozyme used (either in its saline form or not) was that one of SPA-società Prodotti Antibiotici, i.e. a commercial product. The Micrococcus luteus used to measure the lysozyme activity was ATCC 4698. The Clostridium botulinum strains were cultured either in complex TPGY (trypticase peptone—glucose yeast extract) medium or in minimal medium, in tubes for anaerobic cultures at 35° C.

The antibacterial activity of lysozyme and of salts thereof alone or in association with adjuvant or synergistic agents was preliminary tested by two methods:
1. The growth inhibition of microorganism colonies in a culture medium to which lysozyme and synergistic or adjuvant agents had been added alone or in association was evaluated.
2. The cells lysis in logarithmic growth phase through injections of lysozyme solutions, and of coadjuvant or synergistic agents alone or in association in the cultures was determined.

In method 1, Clostridium botulinum cultures, were inoculated in the growth medium, and then 0.1 ml of a lysozyme solution sterily filtered was added (100 mg/ml was the mother solution concentration) and/of synergistic or adjuvant agents alone or in association. The cultures were then incubated at various temperatures and the growth at different various times was determined by the absorbance reading at 600 nm with a Spectronic 20 (Bausch and Lomb, Inc. Rochester, N.Y.) spectrophotometer.

In method 2, lysozyme and its synergistic or adjuvant agents, alone or in association, were added to the cultures which were already in logarithmic growth phase in the medium. The lysis was evaluated at time intervals determining the absorbance at 600 nm.

Foods potentially susceptible to be contaminated by Clostridium botulinum, as meat, fish and vegetables, were purchased in the market. Every food, after having been added with lysozyme or with the salts thereof alone or together with synergistic or adjuvant agents, was inoculated with Clostridium botulinum spores. Then it was packaged in plastic bags wherefrom air was taken away in such a way to make anaerobic conditions and then the food was stored under vacuum. In some cases, the food was packaged in plastic bags in an atmosphere of inert gases (80% $CO_2$ and 20% $N_2$) to verify if an atmosphere of inert gases could affect the activity of the lysozyme alone or associated with other inhibitors. The bags were then ermetically hot sealed and stored at various temperatures for several days.

Seven double tests have been carried out on each food:
—control (without treatments);
—lysozyme;
—adjuvant;
—Clostridium botulinum spores alone;
—Clostridium botulinum spores+lysozyme;
—Clostridium botulinum spores+adjuvant;
—Clostridium botulinum+lysozyme+adjuvant.

The formation of botulinal toxin was checked on each sample. The toxin search has been carried out using biological tests on rats, as described in the "Compendium of Methods for the Microbiological Examination of Foods" (7th edition, S. M. Finegold and E. S. Baron, eds.). Besides the lysozyme analysis was carried out to check the stability thereof in time in the food whereto it had been added. For this purpose, an aqueous food extract, duly diluted, was added to a Micrococcus luteus cells suspension in phosphate buffer 0.067M (pH=6.6). It was possible to deduce the present quantity of lysozyme from the absorbance decrease, therefore to deduce the stability thereof.

The results obtained are reported in graphic form for conciseness and clarity in the enclosed figure and tables, comprising the figures from 1 to 5.

To illustrate the invention, some examples are hereinafter described, being them however non limiting examples.

EXAMPLE 1

GROWING INHIBITION OF E TYPE CLOSTRIDIUM BOTULINUM IN TPGY COMPLEX MEDIUM AT 30° C.

The following aqueous solutions have been prepared and sterily filtered:
—Lysozyme 100 mg/ml;
—EDTA (sodium salt)

These solutions were, separately or in mixture, added to a TPGY complex medium inoculated with E type Clostridium botulinum cells. The cultures were then incubated at 30° C. The absorbance was measured at 660 nm at time intervals.

Figure 1:
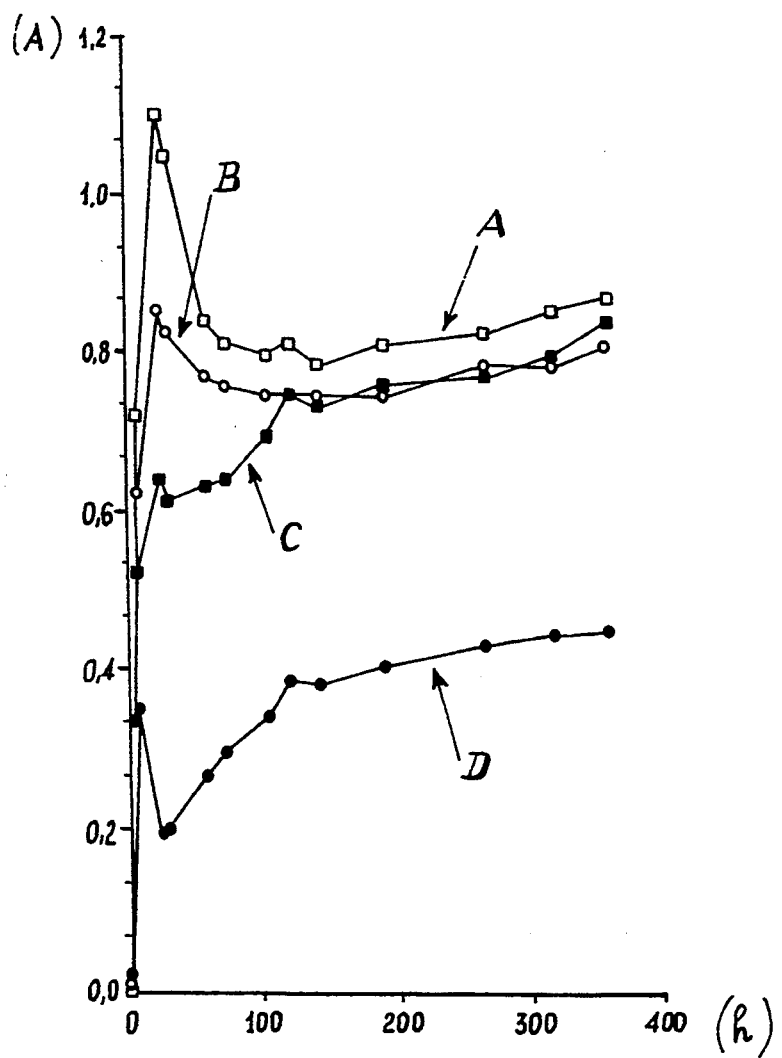
FIG. 1 shows the inhibition of the growth of Clostridium botulinum—E type—in TPGY complex medium at 30° C., the A curve is relative to the control, the B curve is relative to the addition of 100 ppm of lysozyme, the C curve is relative to the addition of 1 mM of EDTA and the D curve is relative to the addition of a solution containing 100 ppm of lysozyme and 1 mM of EDTA.

In the graph of FIG. 1 the absorbance (A) values obtained in the tests carried out, each in double, are reported in ordinate and time (hours) in abscissa.

From the graph it comes out that lysozyme or EDTA, alone, do not substantially inhibit the Clostridium botulinum cells growth in complex medium and at the optimal temperature for its growth. The lysozyme (100 ppm) and EDTA (1 mM) mixture, produces instead a sharp growth inhibition. From this test, the strengthening effect of EDTA, sodium salt on lysozyme comes out in a clear way.

EXAMPLE 2

LYTIC EFFECT ON E TYPE CLOSTRIDIUM BOTULINUM CULTURES IN TPGY COMPLEX MEDIUM IN LOGARITHMIC GROWTH PHASE AT 30° C.

Figure 2:
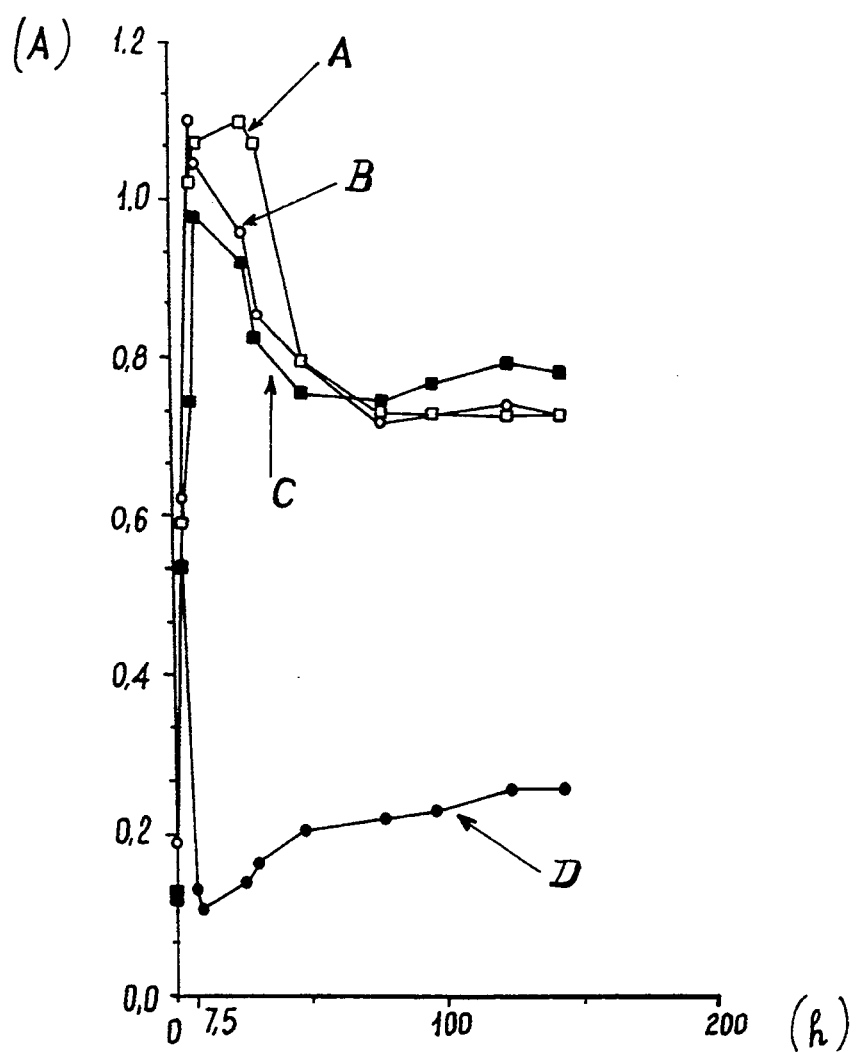
FIG. 2 shows the lytic effect on Clostridium botulinum cultures—E type—in TPGY complex medium, in logarithmic growth phase at 30° C.: the A, B, C and D curves are relative to the solutions reported in the description of FIG. 1.

An E type Clostridium botulinum cells culture has been prepared in TPGY complex medium. The culture has been put to incubate at 30° C. After 7.5 hours, when the culture was in logarithmic growth phase, the solutions reported in the Example 1 were added. FIG. 2 reports in graph the obtained results.

The graph clearly illustrates the antibacterial effect of lysozyme+EDTA (sodium salt) even on Clostridium botulinum cells in logarithmic growth phase in TPGY complex medium and at the growth optimal temperature.

EXAMPLE 3

GROWTH INHIBITION OF E TYPE CLOSTRIDIUM BOTULINUM IN MINIMAL MEDIUM AT 30° C.

The following aqueous solutions have been prepared and sterily filtered:
—lysozyme 100 mg/ml;
—tripolyphosphate.

An E type Clostridium botulinum culture has been then prepared in minimal culture medium. The hereabove solutions were then added separately or in admixture so to obtain the final concentrations as reported in the FIG. 3 graph. The cultures were put to incubate and the absorbance in time was controlled.

Figure 3:
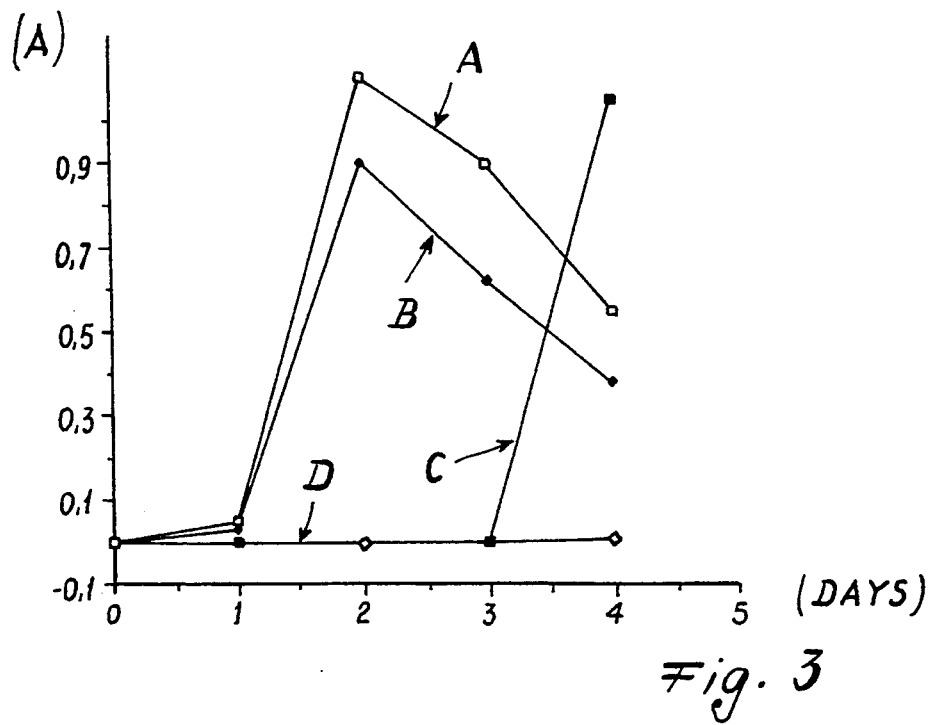
FIG. 3 shows the inhibition of Clostridium botulinum growth—E type—in minimal medium at 30° C.: the A curve is relative to the control, the B curve is relative to the addition of 100 ppm of lysozyme, the C curve is relative to the addition of 1000 ppm of tripolyphosphate and the D curve is relative to a solution containing 100 ppm of lysozyme and 1000 ppm of tripolyphosphate.

The results obtained are reported in graphic form in the same FIG. 3.

It appears evident from the graph that tripolyphosphate alone inhibits the E Clostridium botulinum growth, but until 3 days only. The lysozyme+tripolyphosphate association, instead, delays in the time said growth inhibition.

EXAMPLE 4

EFFECT OF LYSOZYME-TRIPOLYPHOSPHATE ASSOCIATION ON B TYPE CLOSTRIDIUM BOTULINUM SPORES GERMINATION

Figure 4:
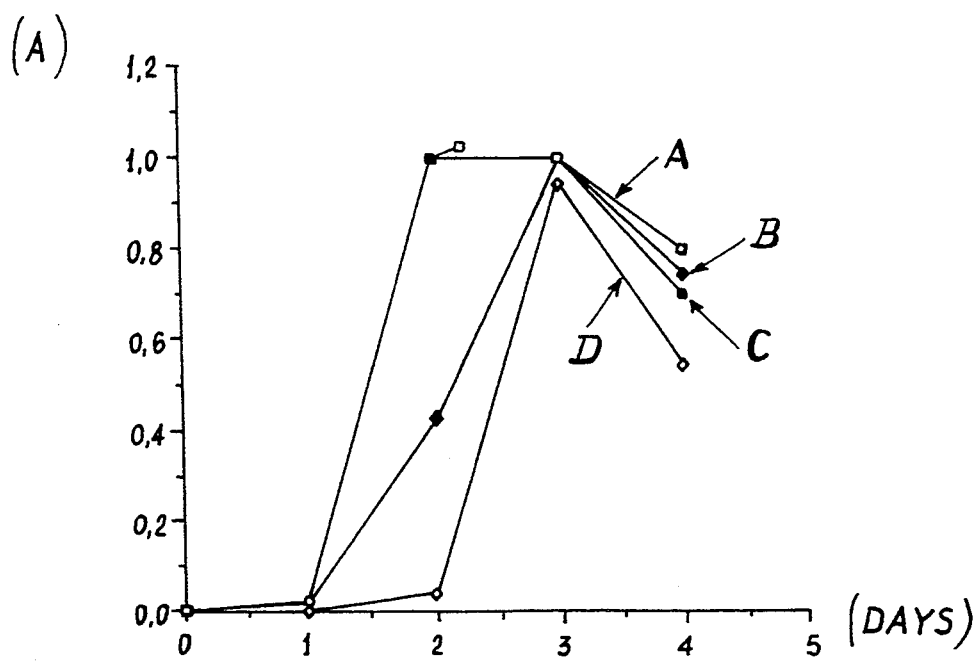
FIG. 4 shows the effect of the lysozyme-tripolyphosphate association on B type Clostridium botulinum spores germination: the A, B, C and D curves are relative to the solutions reported in the description of FIG. 3.

The lysozyme association with tripolyphosphate has an action also on the B type Clostridium botulinum spores germination when they are put in a complex medium and at the growth optimal temperature of 30° C. FIG. 4 reports in graphic form the results obtained in the test. It appears therefrom evident that while lysozyme and tripolyphosphate alone do not have any effect, the association thereof delays the spores germination.

EXAMPLE 5

EFFECT ON THE A TYPE CLOSTRIDIUM BOTULINUM SPORES GERMINATION

Given the inhibiting action on the B type Clostridium botulinum spores germination, we have repeated the experiment on the A type Clostridium botulinum.

It has been observed that the lysozyme with tripolyphosphate association completely inhibits the germination of this kind of spores too.

Figure 5:
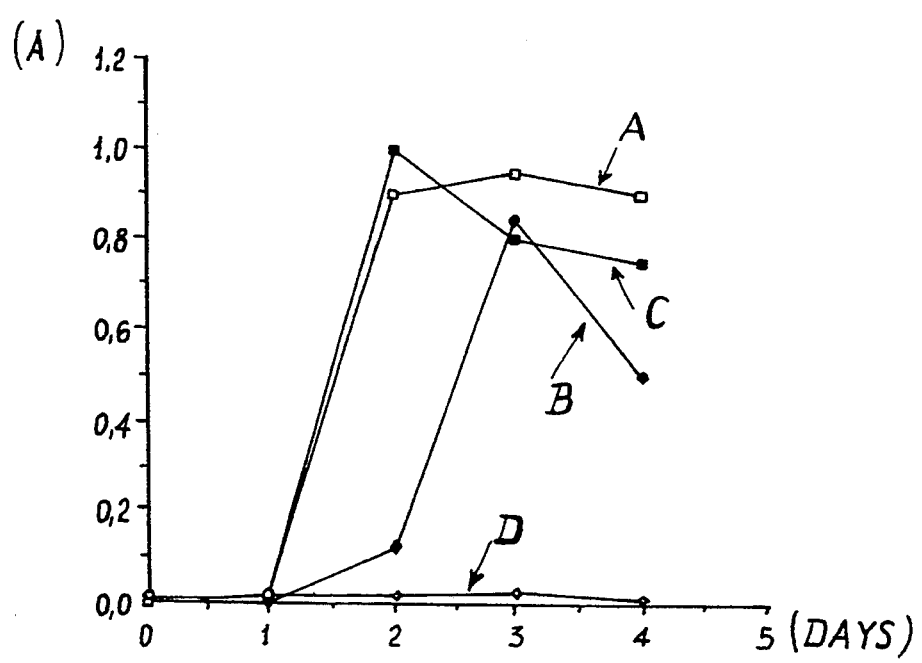
FIG. 5 shows the effect of lysozyme and tripolyphosphate on—A type—Clostridium botulinum spores germination—in minimal medium at 35° C.: the A, B, C and D curves are relative to the solutions reported in the description of FIG. 3.

The results obtained are reported in FIG. 5. From this Figure, the synergistic action between lysozyme and tripolyphosphate appears evident.

EXAMPLE 6

EFFECT OF TEMPERATURE ON LYSOZYME AND EDTA ACTIVITIES, ALONE OR IN ASSOCIATION, ON GROWING INHIBITION OF CLOSTRIDIUM BOTULINUM IWANAI E IN MINIMAL MEDIUM

Two aqueous solutions were prepared and sterily filtered, one of lysozyme hydrochloride and one of EDTA sodium salt. A culture of Clostridium botulinum Iwanay E has been then prepared in minimal medium.

The above mentioned two solutions were added alone or in mixture to the culture.

The various cultures added or not with inhibitors were put to incubate for 2, 3, 6, 15 days at 30°, 24°, 16°, 4° C. respectively.

The pH of all the tests was 6.0.

The results obtained are reported in the Table 1 herebelow.

TABLE 1

| Temperature (°C.) | pH | Control (without additives) | Lysozyme (100 ppm) | Growth (A660) EDTA (0.5mM) | Lysozyme + EDTA |
|---|---|---|---|---|---|
| 30 | 6.0 | 1.15 | 1.07 | 0.56 | 0.72 |
| 24 | 6.0 | 1.15 | 1.05 | 0.68 | 0.18 |
| 16 | 6.0 | 0.73 | 0.76 | 0.41 | 0.13 |
| 4 | 6.0 | 0.20 | 0.05 | 0.12 | 0.01 |

The effectiveness of the two inhibitors as it appears evident from the table, in particular that one of lysozyme, increases with the temperature decreasing. This has a particular importance because the temperature of 4° C. is that one which more often is used for food preservation.

EXAMPLE 7

EFFECT OF pH ON EFFECTIVENESS OF LYSOZYME AND EDTA, ALONE OR IN ASSOCIATION, ON GROWING INHIBITION OF CLOSTRIDIUM BOTULINUM IWANAI E AND IN MINIMAL MEDIUM

The previous example has been repeated yet varying the pH of the cultures put to incubate and maintaining constant the incubation temperature. The temperature of 4° C. has been chosen because it is that one to which generally the food packagings are maintained.

The results reported in the hereinbelow Table 2 have been obtained after 15 days of incubation.

TABLE 2

| pH | Temperature (°C.) | Control (without additives) | Lysozyme (100 ppm) | Growth (A660) EDTA (0.5mM) | Lysozyme + EDTA |
|---|---|---|---|---|---|
| 7.4 | 4 | 0.81 | 0.49 | 0.76 | 0.44 |
| 6.5 | 4 | 0.42 | 0.35 | 0.16 | 0.08 |
| 6.0 | 4 | 0.20 | 0.05 | 0.12 | 0.01 |
| 5.5 | 4 | 0.20 | 0.04 | 0.03 | 0.02 |

The inhibitors activity that comes out from the table is maximum at pH 6.0 and 5.5.

This result is important because pH 6.0 and 5.5 are near to those ones of foods.

EXAMPLE 8

Frozen grinded lean turkey meat purchased on the market has been used as food in the present experiment.

It has been inoculated with a spore cocktail of different strains of Clostridium botulinum.

Samples, each of 50 g, have been prepared.

Each sample has been suspended in 200 ml of water containing 1 g/l of cysteine and 2 mg/l of resazurine.

Everything has been homogenized for 1.5-2 minutes. Portions of 10 ml of the suspension have been pipetted in Hungate anaerobic tubes and put into autoclave for 15 minutes 121° C. and then cooled.

Nothing more was added to the content of a first part of the tubes, while to the contents of other ones a lysozyme solution, a solution of the synergistic substances provided by the invention and a combined solution of lysozyme and synergistic substance were respectively added.

The tubes contents were then inoculated with $10^{3-104}$ of a spores cocktail per tube. The tubes were then incubated at 27° C. or at 37° C. 1000 spores/g as inoculum were used for the tubes incubated at 27° C. 1000 or 10000 spores/g were used for the tubes incubated at 37° C. The tubes were removed from the incubator at different days of incubation in order to have 2 tubes for each sample. One ml of the suspension was taken from each tube and centrifugated. For each sample 0.4 ml of the supernatant were diluted to 2 ml with water and 0.5 ml were injected to two rats.

The rats were controlled for botulism symptoms and mortality. The toxin control ended when the takings of each of the two tubes of every sample were both toxic.

The results relative to the inhibition of the toxin formation are reported in the tables 3 and 4.

TABLE 3

Inhibition of botulinal toxin formation in turkey suspensions by lysozyme with and without additional substance.

| Treatment | Detection of toxin | | | | | |
|---|---|---|---|---|---|---|
| | 0 | 3 | 7 | 14 | 21 | 28 (days) |
| 1. Control | −/− | +/+ | | | | |
| 2. Lysozyme 100 ppm | −/− | −/− | −/− | −/− | +/+ | |
| 3. Cysteine, 1 mM | −/− | +/− | +/− | +/+ | | |
| 4. + Lysozyme 100 ppm | −/− | −/− | −/− | −/− | −/− | −/− |
| 5. Cysteine, 5 mM | −/− | −/− | +/+ | | | |
| 6. + Lysozyme 100 ppm | −/− | −/− | −/− | −/− | −/− | −/− |
| 7. Proline, 1 mM | −/− | +/− | +/+ | | | |
| 8. + Lysozyme 100 ppm | −/− | −/− | −/− | −/− | −/− | −/− |

(+) represents the presence of botulinal toxin in one of the tubes. Toxin assays were discontinued when duplicate tubes were positive (+)

TABLE 4

Chelators effect on the formation of *Clostridium botulinum* toxin in turkey suspensions.

| Treatment | Detection of toxin | | | | | |
|---|---|---|---|---|---|---|
| | 0 | 3 | 7 | 14 | 21 | 28 (days) |
| 1. Control (without additives) | −/− | +/+ | | | | |
| 2. Lysozyme (LZ), 100 ppm | −/− | −/− | −/− | +/+ | | |
| 3. EDTA, 1 mM | −/− | −/+ | +/+ | | | |
| 4. EDTA, 1 mM + LZ 100 ppm | −/− | −/− | −/− | −/− | −/− | −/− |
| 5. EDTA, 3 mM | −/− | −/− | +/+ | | | |
| 6. EDTA, 3 mM + LZ 100 ppm | −/− | −/− | −/− | −/− | −/− | −/− |
| 7. EGTA, 1 mM | −/− | −/− | −/+ | −/+ | −/+ | +/+ |
| 8. EGTA, 1 mM + LZ 100 ppm | −/− | −/− | −/− | −/− | −/− | −/− |
| 9. DTPA, | −/− | −/+ | −/+ | +/+ | | |

TABLE 4-continued

Chelators effect on the formation of
Clostridium botulinum toxin in turkey suspensions.

| Treatment | Detection of toxin | | | | | |
|---|---|---|---|---|---|---|
| | 0 | 3 | 7 | 14 | 21 | 28 (days) |
| 10. DTPA, 1 mM | −/− | −/− | −/− | −/− | −/− | −/− |
| 1 mM + LZ 100 ppm | | | | | | |
| 11. DTPA, 3 mM | −/− | −/− | −/− | −/+ | −/+ | −/+ |
| 12. DTPA, 3 mM + LZ 100 ppm | −/− | −/− | −/− | −/− | −/− | −/− |
| 13. ED, 1 mM | −/− | −/+ | −/+ | +/+ | | |
| 14. ED, 1 mM + LZ 100 ppm | −/− | −/− | −/− | −/− | −/− | −/− |
| 15. CDTA, 1 mM | −/− | +/+ | | | | |
| 16. CDTA, 1 mM + LZ 100 ppm | −/− | −/− | −/− | −/− | −/− | −/− |
| 17. CDTA, 3 mM | −/− | −/− | +/+ | | | |
| 18. CDTA, 3 mM − LZ 100 ppm | −/− | −/− | −/− | −/− | −/− | −/− |

ABBREVIATIONS:
EDTA = ethylendiaminotetracetic acid
EGTA = ethylendioxy diethylendinitrilotetracetic acid
DTPA = diethylentriaminopentacetic acid
ED = ethylendiamine
CDTA = trans-1,2-diaminocyclohexantetracetic acid The results that have been obtained indicate that the lysozyme/adjuvant combination is a preserving agent suitable to prevent botulinogenesis in turkey-based products.

EXAMPLE 9

The anti-botulinic effect of lysozyme and of the associations thereof has been verified in this test on potatoes.

Some potatoes were purchased on the market. They were washed, peeled, finely cut and blanched for ten minutes by steaming.

Samples of 20 g each, were put in vacuum bags. The various inhibitors and then a suspension of $10^2$–$10^3$ per gram of a spores cocktail of the A, B and E types Clostridium botulinum whose toxins are frequently present in potatoes were added. The spores were subjected to thermic shock before the addition: 60° C. and 80° C. for 15 minutes respectively for those ones non proteolitic and for those ones proteolitic.

The content in the various bags was well mixed, and the bags were closed under vacuum and incubated at 28° C.

The determination of the botulinic toxin was effected using the techniques of the previous example.

The results are reported in Table 5.

TABLE 5

Inhibition of the formation of the botulinic toxin in
potatoes by suspension by lysozyme and
various chelating agents.

| Treatment | Detection of toxin | | | | | |
|---|---|---|---|---|---|---|
| | 0 | 3 | 7 | 14 | 21 | 28 (days) |
| 1. Control | −/− | +/+ | | | | |
| 2. Lysozyme, 100 ppm | −/− | −/− | +/+ | | | |
| 3. EDTA, 1 mM | −/− | −/− | +/− | +/+ | | |
| 4. + Lysozyme 100 ppm | −/− | −/− | −/− | −/− | −/− | −/− |
| 5. EDTA, 3 mM | −/− | −/− | −/− | −/− | +/− | +/− |
| 6. + Lysozyme 100 ppm | −/− | −/− | −/− | −/− | −/− | −/− |
| 7. DTPA, 100 ppm | −/− | +/+ | | | | |
| 8. + Lysozyme 100 ppm | −/− | −/− | −/− | −/− | −/− | +/− |
| 9. DTPA, 1 mM | −/− | −/− | −/− | +/− | +/− | +/− |
| 10. + Lysozyme 100 ppm | −/− | −/− | −/− | −/− | −/− | −/− |
| 11. Cysteine, 5 mm | −/− | +/− | +/+ | | | |
| 12. Cysteine + Lysozyme 100 ppM | −/− | −/− | +/+ | | | |

EXAMPLE 10

Some asparaguses were purchased in a supermarket. They were cut in small pieces and steamed for 10 minutes. Portions of 20 g were put in plastic bags and added with 10 ml of a lysozyme, adjuvant or synergistic agents solution alone or in association.

Spores of Clostridium botulinum were thermically stressed (15 minutes at 60° C. or 80° C. respectively for those ones non proteolitic and for those ones proteolytic) and added in amounts of $10^2$–$10^3$ per gram.

The content of said bags was well mixed, the air was substituted by an inert gas mixture (80% of $CO_2$ and 20% of $N_2$) and the bags, well closed, put to incubate at 28° C.

The results obtained are reported in Table 6.

TABLE 6

Inhibition of the formation of the
botulinic toxin in asparagus suspension by lysozyme
and various chelating agents.

| Treatment | Detection of toxin | | | | |
|---|---|---|---|---|---|
| | 0 | 3 | 7 | 14 | 21 (days) |
| 1. Control | −/− | +/+ | | | |
| 2. Lysozyme, 100 ppm | −/− | +/+ | | | |
| 3. EDTA, 1 mM | −/− | −/− | +/+ | | |
| 4. + Lysozyme 100 ppm | −/− | −/− | −/− | −/− | −/− |
| 5. EDTA, 3 mM | −/− | −/− | +/− | +/− | +/− |
| 6. + Lysozyme 100 ppm | −/− | −/− | −/− | −/− | −/− |
| 7. DTPA, 1 mM | −/− | +/+ | | | |
| 8. + Lysozyme 100 ppm | −/− | −/− | −/− | −/− | −/− |

EXAMPLE 11

The anti botulinal effect of lysozyme and of the associations thereof has been verified in this test, on salmon.

Fresh salmon slices have been purchased in a supermarket. The flesh has been reduced in a paste and a suspension thereof was made in four parts of water. The incubation temperature is 20° C. The control tests showed the botulinal toxin after three days, while those one with lysozyme alone showed the toxin after seven days. The lysozyme with 3 mM of EDTA inhibited instead the formation of the toxins for three weeks. The results are reported in Table 7.

TABLE 7

Inhibition of the formation of botulinic toxin in salmon suspension by lysozyme and various chelating agents

| Treatment | Detection of toxin | | | | |
|---|---|---|---|---|---|
| | 0 | 3 | 7 | 14 | 21 | 28 |
| | | | (days) | | |
| 1. Control | −/− | +/+ | | | | |
| 2. Lysozyme, 20 ppm | −/− | −/− | +/+ | | | |
| 3. Lysozyme, 100 ppm | −/− | −/− | +/+ | | | |
| 4. Lysozyme, 200 ppm | −/− | −/− | /+ | | | |
| 5. EDTA, 1 mM | −/− | −/− | −/− | −/+ | +/+ | |
| 6. + Lysozyme, 20 ppm | −/− | −/− | −/− | −/− | +/+ | |
| 7. + Lysozyme, 100 ppm | −/− | −/− | −/− | −/+$^a$ | −/− | |
| 8. + Lysozyme, 200 ppm | −/− | −/− | −/− | −/− | −/− | −/+ |
| 9. EDTA 2 mM | −/− | −/− | −/+ | +/+ | | |
| 10. EDTA, 2 mM + Lysozyme 100 ppm | −/− | −/− | −/− | −/+$^a$ | −/− | −/− |
| 11. EDTA, 2 mM + Lysozyme 200 ppm | −/− | −/− | −/− | −/− | −/− | −/+$^a$ |
| 12. EDTA, 3 mM | −/− | −/− | −/− | −/+$^a$ | +/+ | |
| 13. + Lysozyme, 20 ppm | −/− | −/− | −/− | −/− | −/− | +$^a$/+$^a$ |
| 14. + Lysozyme, 100 ppm | −/− | −/− | −/− | −/− | −/− | −/− |

$^a$Only one mouse in the pair died which may have been due to non specific deaths (not caused by botulinic toxin). When both mice in the pair have died, signs of botulism were usually observed.

EXAMPLE 12

The antibotulinal effect of lysozyme and of the associations thereof has been verified in this test on tomatoes.

The procedure which has been utilized is analogous to that one of Example 9.

The suspensions have been reconstituted in two parts of water. The results are reported in Table 8.

TABLE 8

Inhibition of the formation of botulinic toxin in tomato suspension by lysozyme and various chelating agents.

| Treatment | Detection of toxin | | | | |
|---|---|---|---|---|---|
| | 0 | 3 | 7 | 14 | 21 | 28 |
| | | | (days) | | | |
| A, 28° C. | | | | | | |
| 1. Control | −/− | +/+ | | | | |
| 2. Lysozyme, 100 ppm | −/− | +/+ | | | | |
| 3. EDTA 3 mM | −/− | −/− | −/− | +/+ | | |
| 4. EDTA 3 mM + Lysozyme 100 ppm | −/− | −/− | −/− | −/− | +/+ | |
| 5. DTPA, 1 mM | −/− | −/− | +/+ | | | |
| 6. + Lysozyme 100 ppm | −/− | −/− | −/− | −/+ | | |

The composition, according to the invention can be used, for the practical use, on foods following various techniques and procedures, concentrated or in solution, spraying, injecting or admixing it directly with the foods in their natural state, i.e. before undergoing substantial technological transformations.

We claim:

1. A food composition under anaerobic conditions consisting essentially of: a) food having animal or vegetable origin susceptible to contamination by *Clostridium botulinum* under anaerobic conditions; b) lysozyme or non-toxic salts thereof; and a) a member of the group consisting of alkaline salts of ethylendiaminotetracetic acid, (ethylendioxy)-diethylenedinitriloacetic acid, diethylenetriaminopentacetic acid, trans-1,2-diaminocyclohexanetetracetic acid and tripolyphosphoric acid, wherein b) and c) are present in effective amounts.

2. The composition of claim 1 wherein said non-toxic salt is selected from the group consisting of hydrochloride, lactate, phosphate and citrate.

3. A method to prevent the contamination of foods having animal or vegetable origin by *Clostridium botulinum* or by toxins derived therefrom comprising: applying an effective amount of a) lysozyme or non-toxic salts thereof and b) a member of the group consisting of alkaline salts of ethylendiaminotetracetic acid, (ethylendioxy)-diethylenedinitriloacetic acid, diethylenetriaminopentacetic acid, trans-1,2-diaminocyclohexanetetracetic acid and tripolyphosphoric acid to a food having animal or vegetable origin susceptible to contamination by *Clostridium botulinum*; and storing said food under anaerobic conditions.

4. The method of claim 3 wherein said *Clostridium botulinum* is type A, B, or E.

5. The method of claim 3 wherein said food is selected from the group consisting of turkey, potato, asparagus, tomato and salmon.

* * * * *